June 21, 1955          H. NERWIN          2,711,023
VIEWFINDER FOR PHOTOGRAPHIC CAMERAS
Filed March 29, 1951          2 Sheets-Sheet 1
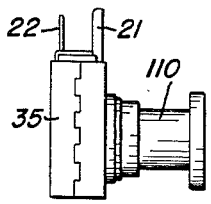
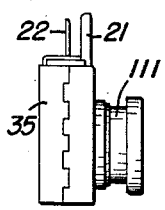
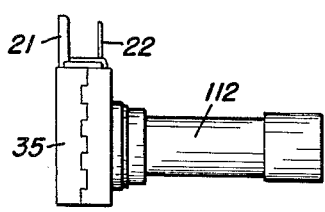
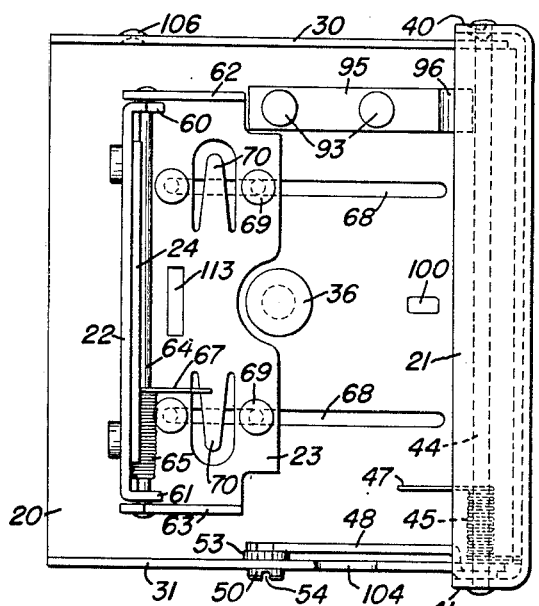
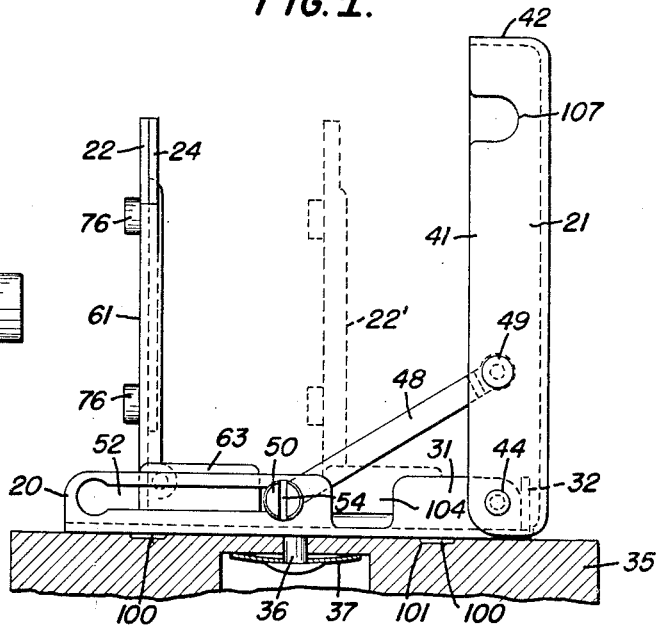
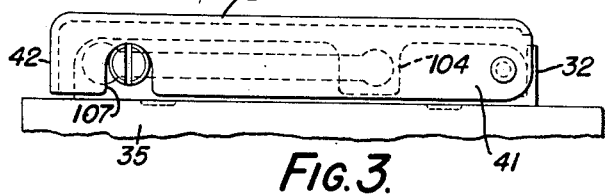
INVENTOR.
HUBERT NERWIN
BY
ATTORNEY

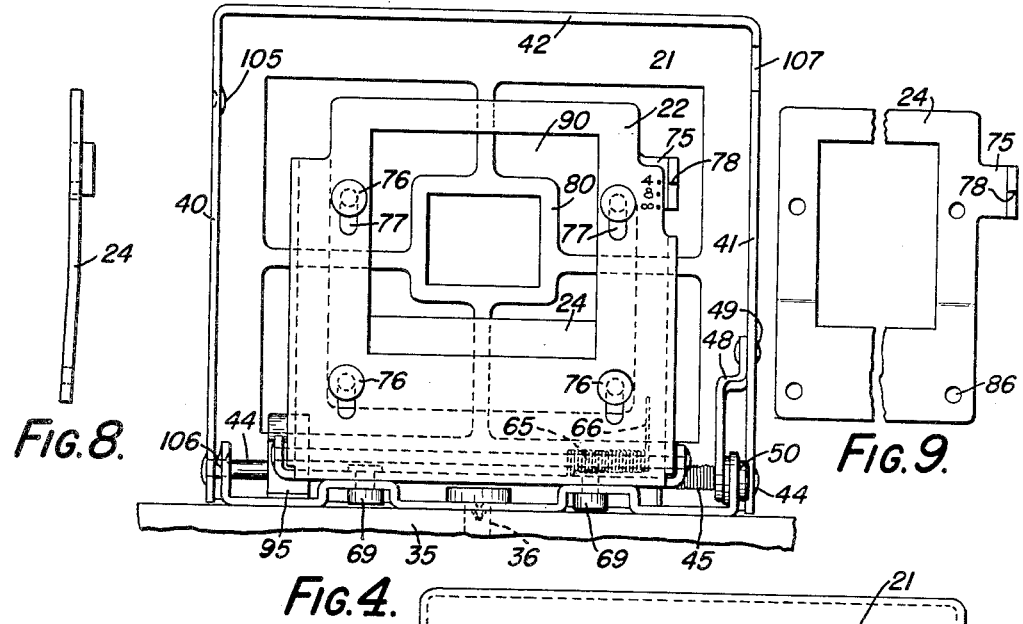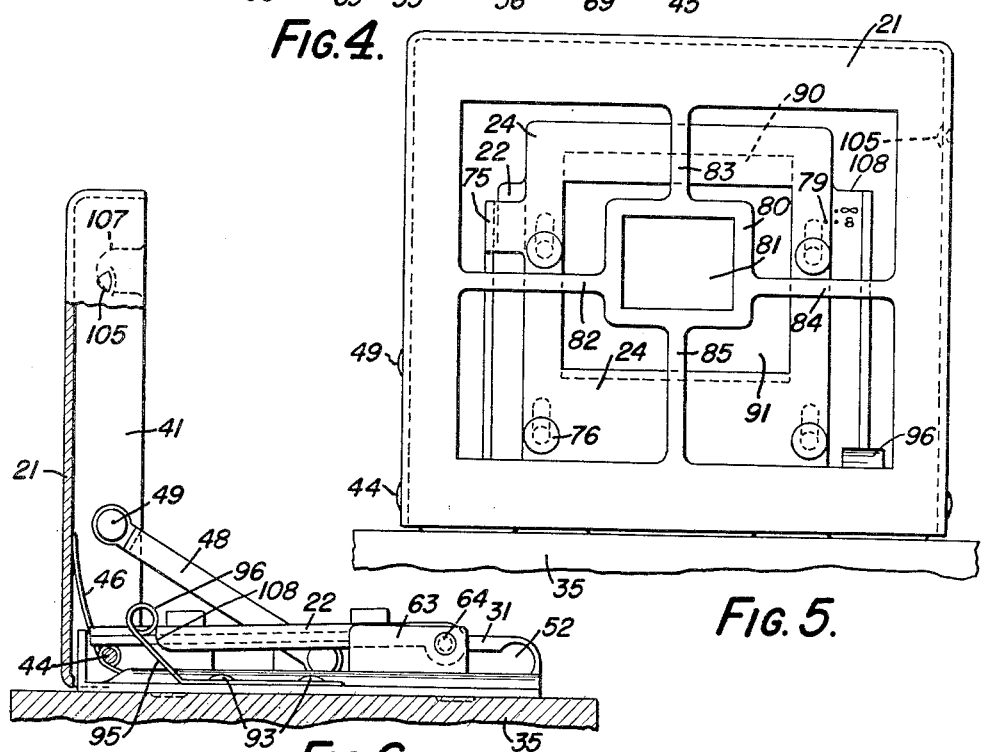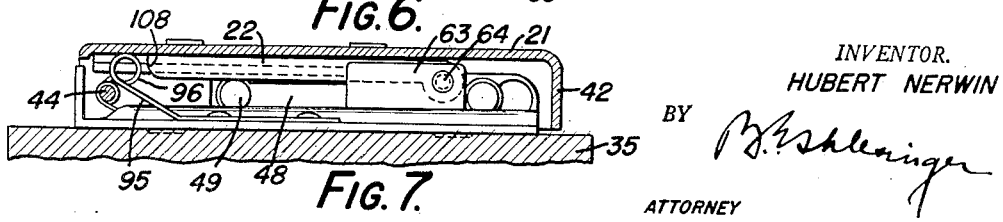

United States Patent Office 2,711,023
Patented June 21, 1955

2,711,023

VIEWFINDER FOR PHOTOGRAPHIC CAMERAS

Hubert Nerwin, Irondequoit, N. Y., assignor to Graflex, Inc., Rochester, N. Y., a corporation of Delaware Application March 29, 1951, Serial No. 218,229

5 Claims. (Cl. 33—64)

The present invention relates to viewfinders for photographic cameras, and more particularly to a so-called wire-type viewfinder, that is, to a viewfinder which operates without optical elements and which comprises a front frame and a rear frame having different sized viewing openings.

Wire-type viewfinders have many advantages because of their simplicity and relative cheapness of construction and because they are less likely to be damaged than a viewfinder employing optical elements.

The conventional wire-type viewfinder, however, is accurate only when employed with an objective lens of a given focal length; and if the lens of the camera is changed the viewfinder is no longer accurate. For military and for some civilian purposes it is desirable to use with a given camera not only a normal angle objective lens but also wide-angle and telescopic lenses. The inflexibility of the conventional wire-type rangefinder makes it unsuitable, therefore, for use on a camera where wide-angle and telescopic lenses are likely to be employed in addition to the normal angle lens.

One object of the present invention is to provide a wire-type viewfinder which is adjustable and which may be employed with wide-angle and with telescopic lenses as well as with a conventional normal angle lens.

Another object of the invention is to provide a wire-type viewfinder which can be employed for normal-angle, wide-angle and telephoto lenses and which has a minimum number of parts.

Another object of the invention is to provide a wire-type viewfinder having the front frame and the rear frame incorporated into a single viewing unit which can be conveniently mounted on a camera.

Another object of the invention is to provide a unitary wire-type viewfinder which can be collapsed when not used so as to be out of the way.

Another object of the present invention is to provide a unitary wire-type viewfinder which can be quickly erected when it is desired to use it.

Still another object of the invention is to provide a unitary wire-type viewfinder which can be collapsed or erected by the photographer with one hand.

Other objects of the invention will be apparent hereinafter from the specification and from the recital of the appended claims.

In the drawings:

Fig. 1 is a plan view of a viewfinder constructed according to one embodiment of this invention, showing the viewfinder in erected position;

Fig. 2 is a side elevation of this viewfinder, showing it mounted on a camera, and showing the small frame of the viewfinder in full lines in the position which it occupies when the viewfinder is being used with a normal-angle lens, and showing the small frame in dotted lines in the position which it occupies when the viewfinder is being used with a wide-angle lens;

Fig. 3 is a side elevation showing the viewfinder in collapsed or closed position on top of the camera;

Fig. 4 is a rear elevation of the erected viewfinder;

Fig. 5 is a front elevation thereof;

Fig. 6 is a view partly in side elevation and partly in section showing the small frame of the rangefinder in collapsed or closed position;

Fig. 7 is a section showing the viewfinder in totally closed or collapsed position;

Fig. 8 is a side view of the parallax slide of the viewfinder, but on a somewhat smaller scale;

Fig. 9 is a fragmentary rear view of this slide on the same scale as Fig. 8; and Figs. 10, 11 and 12 are diagrammatic side elevational views showing a camera equipped with a normal angle, a wide-angle, and a telescopic lens, respectively, and showing the respective positions of adjustment of the viewfinder of this invention for use with these different types of lenses.

Referring now to the drawings by numerals of reference, the viewfinder of the present invention comprises five principal parts, a base 20, a front frame 21, a rear or small frame 22, a support 23 for the rear frame, and a parallax slide 24 which is slidable on the rear frame 22.

The base 20 has upturned side flanges 30 and 31 and an upturned front flange 32. It is adapted to be secured to the body 35 of a camera by a pivot stud 36; and it is rotatably adjustable about the axis of this stud. It is resiliently held in either of the two positions of its rotary adjustment, hereinafter to be described, by a spring washer 37 which engages under the head of the stud 36 between the head of the stud and the inside of the body of the camera 35.

The front frame 21 of the viewfinder is generally rectangular in shape and has inturned side flanges 40 and 41 and an inturned top flange 42. The front frame 21 is mounted on the base 20 with its side flanges 40 and 41 outside of the side flanges 30 and 31 of the base; and it is hingedly connected to the base by a hinge pin 44 which passes through the flanges 40, 30, 31 and 41. A coil spring 45 surrounds the hinge pin 44 and has one end 46 (Fig. 6) bearing against the inside surface of the front frame 21 and its opposite end 47 (Fig. 1) bearing against the top face of the base 20. This spring serves to erect the frame 20.

The front frame 21 is adapted to be held in erected position by a brace 48 which is pivotally connected at one end by means of the rivet 49 to the side flange 41 of the front frame and which has a sliding connection at its opposite end by means of a rivet 50 with the side flange 31 of the base 20. The rivet 50 is adapted to slide in a longitudinal slot 52 in the flange 31. The rivet 50 is an eccentric rivet, the reduced diameter portion of the stem of the rivet, which is engaged in the brace 48, being eccentric of the larger diameter portion of the stem which engages in slot 52. The head of the eccentric rivet 50 contacts the outside surface flange 31; and a washer 53 (Fig. 1) is interposed between the brace 48 and the inside surface of flange 31. The eccentric rivet 50 is provided to permit adjusting the front frame 21 so that the front frame will be perpendicular to base 20 when erected. A slot 54 is provided in the head of the rivet to permit the rivet to be readily rotated with a screw driver.

The small frame 22 is a generally rectangular shaped plate having forwardly-turned side flanges 60 and 61. The support 23 has upturned side flanges 62 and 63. The small or rear frame 22 is hingedly connected to the support 23 by a hinge pin 64 which passes through the side flanges 62, 60, 61 and 63. A coil spring 65, which surrounds the hinge pin 64, serves to urge the small frame 22 to erect position and to maintain this frame in erected position. One end 66 (Fig. 4) of the spring 65 engages the front face of the small frame 22 and the other end 67 (Fig. 1) of the spring 65 engages the upper face of the support 23. A slot 113 (Fig. 1) is provided in support 23; and a screw driver can be inserted into this slot to bend the metal of support 23 up a little to create a permanent stop against which the lower edge of frame 22 engages when erected, to limit the upward swinging movement of rear frame 22 so that when erected it will be perpendicular to support 23 and base 20.

The support 23 is mounted to slide on the base 20. For this purpose, the base 20 is provided with parallel longitudinal slots 68 and the support 23 is slidably secured to the base 20 by studs 69 which engage in the slots 68. Tongues 70 are stamped out of the support 23 and depressed to provide means for frictionally holding the support 23 in any adjusted position on the base 20.

The parallax slide 24 is mounted to slide up and down on the rear frame 22. It has a projecting portion 75 (Figs. 9, 4 and 5) at one side by means of which it may be manually adjusted; and it is preferably normally sprung, as shown in Fig. 8, so that when it is secured to the rear frame 22 it will be held resiliently in any adjusted position thereon. It is adapted to be secured to the rear frame 22 by shoulder rivets 76 which engage in longitudinal slots 77 (Fig. 4) provided in the rear frame 22, and which are secured in holes 86 in the parallax slide (Fig. 9).

The front frame 21 is formed, as clearly shown in Fig. 5, with a small central rectangular viewing window 80 that is connected to the main body of the front frame by the webs 82, 83, 84 and 85. The rear frame 22 is provided with a larger rectangular viewing opening 90 (Figs. 4 and 5); and the parallax slide 24 is provided with a rectangular viewing opening 91. The opening 91 is larger than opening 81 in the window 80 of the front frame but is narrower than the opening 90 in the rear frame, as clearly shown in Fig. 5, so that as the parallax slide 24 is adjusted on the rear frame 22 the position of the composite viewing opening in the parallax slide and rear frame will be changed with reference to the viewing opening 81 in the front frame. Fig. 5 shows the parallax slide in its lowermost position of adjustment; and Fig. 4 shows the parallax slide in its uppermost adjusted position.

The rear face of the rear frame 22 is graduated, as shown in Fig. 4, to read against a zero mark 78 on the hand grip portion 75 of the parallax slide. Because the viewfinder is reversible, as will be described more particularly hereinafter, the front face of the rear frame 22 is also graduated, as shown in Fig. 5, to read against a zero dot 79 on the parallax slide 24.

Fastened to the base 20 by rivets 93 is a strap spring 95 (Figs. 1 and 6) that has a coiled end 96 which serves as a catch or detent to hold the rear frame 22 down temporarily, as shown in Fig. 6, after it has been collapsed and before the front frame 21 is closed down on top of the rear frame.

The normal position of use of the viewfinder is that shown in Figs. 1 and 2 in full lines. This is the position employed when the camera is equipped with a normal-angle objective 110 (Fig. 10). When a wide-angle objective 111 (Fig. 11) is substituted for the normal-angle objective 110, the support 23 is moved forward on the base to bring the rear frame 22 to the dotted line position denoted at 22' in Fig. 2 and further illustrated in Fig. 11. When a telephoto lens 112 is used on the camera, the viewfinder is rotated about the axis of stud 36 (Fig. 2) to reverse it end for end, and to put the small frame 22 at the front of the camera and the large frame 21 at the rear so that the photographer looks through the opening 81 of the large frame forwardly through the opening resulting from the adjustment of the parallax slide on the small frame 22. The photographer's view is such as shown in Fig. 5. Parallax slide 24 is adjustable on the small frame 22 in any one of the different positions of the viewfinder in accordance with the distance from the camera of the object which is to be photographed.

The base 20 is provided on its under face with teats 100 (Fig. 2) which are formed by stamping downwardly depressions in the upper surface of the base. These teats are adapted to snap into depressions 101 in the top surface of the camera case 35 to hold the viewfinder frictionally in either of its two positions of rotational adjustment.

The viewfinder is made so that the photographer can manipulate it with one hand. To collapse the viewfinder the photographer first folds down the small rear frame 22, after adjusting it to its rearmost position, namely, the full line position shown in Fig. 2. The coil 96 of the spring 95 is so positioned that when the small frame 22 is folded down, as shown in Fig. 6, it engages one corner 108 of this frame to resiliently hold this frame in folded position. In the downward movement of the small rear frame the coil 96 is engaged by the shoulder 108 of the rear frame and pushed forwardly, and then it snaps over the rear frame as shown in Fig. 6. Then the operator folds the large front frame 21 down over the rear frame 22 to the position shown in Fig. 7. As the large front frame is folded, the lower part of its rear face engages the coil 96 and depresses the spring 95, as shown in Fig. 7, releasing the coil 96 from engagement with the small rear frame 22. Thus, the small rear frame 22 is ready to be erected by the spring 65 as soon as the front frame 21 is again erected. The front frame 21 is locked in its folded position by engagement of a teat 105 (Figs. 4 and 6), which is stamped on the inside of the side flange 40 of the front frame, with a teat 106 (Figs. 1 and 4), which is stamped outwardly from the side flange 30 of the base 20. Thus, the front frame 21 is frictionally held in closed position against the urge of the spring 45 to erect it. A notch 104 (Fig. 2) in the side flange 31 of the base permits brace 48 to nest in the collapsed viewfinder, see Fig. 3, and a notch 107 (Figs. 2 and 3) in the side flange 41 of the front frame receives rivet 50 when the front frame is folded down.

To erect the viewfinder the photographer grasps the front frame and raises it up. The teats 105 and 106 are only frictional detents and are readily disengaged. As soon as the front frame is disengaged, the coil spring 45 will act to automatically erect it, and simultaneously the coil spring 65 will act automatically to erect the rear frame 22. It will thus be seen that I have provided a viewfinder which can be manipulated with one hand, and which also can be used with various angle lenses.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the limits of the appended claims.

Having thus described my invention, what I claim is:

1. A viewfinder for photographic cameras comprising a base, a rear frame hingedly mounted on said base to be folded down thereupon and having a viewing opening therethrough, a front frame hingedly mounted on said base to be folded down on top of said rear frame and having a viewing opening therethrough which is of a different size from the first viewing opening, spring means for constantly urging both frames into erect, viewing positions, a detent for holding one of said frame releasably in folded position against the base, means on the other frame operative to release said detent when said other frame is folded down over said one frame, and a detent for releasably holding said other frame in folded position over said one frame and said base.

2. A viewfinder for photographic cameras comprising a base which is attachable to a camera, a front frame hingedly mounted on said base to be folded down thereupon and having a viewing opening therethrough, a support slidable on said base toward and from the front frame, a rear frame hingedly mounted on said support to be folded down upon said base and said support and having a viewing opening therethrough which is of a different size from the first-named viewing opening, spring means for constantly urging both frames into erect, viewing positions, a detent for holding the rear frame releasably in folded position against said support and said base, means on the front frame operative to release said detent when the front frame is folded down over the rear frame, a detent for releasably holding said front frame in folded position over said rear frame and said base, and a parallax slide adjustably slidable on one of said frames, when it is erect, and having a viewing opening therethrough.

3. In combination, a photographic camera, and a viewfinder mounted on said camera, said viewfinder comprising a base, a front frame hingedly mounted on said base to be folded down thereupon and having a viewing opening therethrough, a support slidable on said base toward and from the front frame, a rear frame hingedly mounted on said support to be folded down upon said base and said support and having a viewing opening therethrough which is of a different size from the first-named viewing opening, spring means for constantly urging both frames into erect, viewing positions, a detent for holding the rear frame releasably in folded position against said support and said base, means on the front frame operative to release said detent when the front frame is folded down over said rear frame, a detent for releasably holding said front frame in folded position over the folded rear frame, a parallax slide mounted on one of said frames for slidable adjustment thereon and having a viewing opening therethrough, and means for securing said base to the camera to permit rotary adjustment of the viewfinder on the camera to reverse the positions of said front and rear frames on the camera.

4. A viewfinder for photographic cameras comprising a generally rectangular base which is adapted to be mounted on a camera for rotary adjustment thereon about an axis perpendicular to the plane of the base, a generally-rectangular front frame hingedly connected to said base along one edge of said front frame to be foldable down on said base, said front frame having rearwardly projecting flanges along its other three edges and having a small rectangular viewing opening therethrough, a support slidable on said base toward and from the front frame, a generally rectangular shaped rear frame hingedly connected to said support along one edge of said rear frame and adapted to be folded down on said support and said base, said rear frame having a generally rectangular viewing opening therethrough which is larger than the viewing opening in said front frame, a parallax slide mounted on said rear frame for adjustment vertically thereon when said rear frame is erect, said parallax slide having a generally rectangular viewing opening therethrough, spring means for constantly urging both said frames into erect, viewing positions, a detent for releasably holding the rear frame in folded position against said support and said base, means on the front frame operative to release said detent when the front frame is folded down over the rear frame, a detent for releasably holding said front frame in folded position over said rear frame and said base, the flanges of said front frame being positioned to enclose said rear frame, said support and said base along three edges when said front frame is folded down, and said base having an upwardly projecting flange along the hinged edge of said front frame to form with the flanges of said front frame and with said front frame and with said base an enclosure for the rear frame and its support.

5. A viewfinder for photographic cameras comprising a base, a front frame hingedly mounted on said base at the front end of said base to be folded down thereupon and having a viewing opening therethrough, a rear frame hingedly mounted on said base behind said front frame to be folded down upon said base and having a viewing opening therethrough which is of a different size from the first-named viewing opening, spring means for constantly urging both frames into erect, viewing positions, detent means for holding both frames in folded position against said base and one another, a brace hingedly connected at one end to one of said frames and slidably connected at its opposite end to said base and serving to hold said one frame in erect position, an eccentric rivet forming the connection between one end of the brace and the part to which it is connected, said rivet being rotatably adjustable so that when erect said one frame will be perpendicular to said base, and means for limiting movement of the other frame to erect position so that when said other frame is erect it also will be perpendicular to the base.

References Cited in the file of this patent

UNITED STATES PATENTS

| 1,423,809 | Marks | July 25, 1922 |
| 1,438,230 | Gilbert | Dec. 12, 1922 |
| 1,616,723 | Wandersleb | Feb. 8, 1927 |

FOREIGN PATENTS

| 6,361 | France | Aug. 29, 1906 |

OTHER REFERENCES

Street: "Parallax Compensation on a Direct-Vision View Finder," The American Photographer and Cinematographer Magazine, July 22, 1936, page 77. Copy in 88–1–5 NR.